(12) United States Patent
Neema et al.

(10) Patent No.: US 11,474,555 B1
(45) Date of Patent: Oct. 18, 2022

(54) DATA-DRIVEN PLATFORM CHARACTERISTICS CAPTURE AND DISCOVERY FOR HARDWARE ACCELERATORS

(71) Applicant: Xilinx, Inc., San Jose, CA (US)

(72) Inventors: Hem C. Neema, San Jose, CA (US); Sonal Santan, San Jose, CA (US); Julian M. Kain, Longmont, CO (US); Stephen P. Rozum, Loveland, CO (US); Khang K. Dao, San Jose, CA (US); Kyle Corbett, Campbell, CA (US)

(73) Assignee: XILINX, INC., San Jose, CA (US)

( * ) Notice: Subject to any disclaimer, the term of this patent is extended or adjusted under 35 U.S.C. 154(b) by 387 days.

(21) Appl. No.: 15/684,035

(22) Filed: Aug. 23, 2017

(51) Int. Cl.
```
G06F 1/10      (2006.01)
G06F 13/10     (2006.01)
G06F 13/28     (2006.01)
G06F 13/16     (2006.01)
G06F 13/40     (2006.01)
```

(52) U.S. Cl.
CPC ............ *G06F 1/10* (2013.01); *G06F 13/102* (2013.01); *G06F 13/1668* (2013.01); *G06F 13/28* (2013.01); *G06F 13/4068* (2013.01)

(58) Field of Classification Search
CPC ...... G06F 1/10; G06F 13/102; G06F 13/1668; G06F 13/28; G06F 13/4068
USPC .................................. 713/190; 710/110, 106
See application file for complete search history.

(56) References Cited

U.S. PATENT DOCUMENTS

| | | | | |
|---|---|---|---|---|
| 7,499,347 B2 * | 3/2009 | Chen | ........................ | G11C 7/14 365/194 |
| 9,218,443 B1 * | 12/2015 | Styles | ..................... | G06F 8/451 |
| 9,977,758 B1 * | 5/2018 | Schumacher | ....... | G06F 13/4221 |
| 2007/0288692 A1 * | 12/2007 | Bruce | ..................... | G06F 3/061 711/113 |
| 2012/0265515 A1 * | 10/2012 | Weintraub | .......... | G06F 17/5027 703/15 |
| 2013/0318268 A1 * | 11/2013 | Dalal | .................... | G06F 13/364 710/113 |
| 2013/0346759 A1 * | 12/2013 | LaMacchia | ............. | G06F 21/57 713/190 |
| 2014/0129788 A1 * | 5/2014 | Cho | ........................ | G06F 21/79 711/162 |
| 2015/0006768 A1 * | 1/2015 | Litch | ....................... | G06F 13/28 710/26 |
| 2016/0132441 A1 * | 5/2016 | Styles | ..................... | G06F 13/28 710/110 |
| 2016/0203096 A1 * | 7/2016 | Arbel | .................. | G06F 13/4068 710/106 |

(Continued)

*Primary Examiner* — Aurel Prifti (74) *Attorney, Agent, or Firm* — Patterson + Sheridan, LLP (57) ABSTRACT

An example computing system includes: a processing system, a hardware accelerator coupled to the processing system, and a software platform executing on the processing system. The hardware accelerator includes: a programmable integrated circuit (IC) configured with an acceleration circuit having a static region and a programmable region; a memory in the programmable IC configured to store metadata describing interface circuitry in at least one of the static region and the programmable region of the acceleration circuit. The software platform includes program code executable by the processing system to read the metadata from the memory of the hardware accelerator.

20 Claims, 8 Drawing Sheets

(56) References Cited

U.S. PATENT DOCUMENTS

| | | | | |
|---|---|---|---|---|
| 2016/0328152 A1* | 11/2016 | Nemazie | .................. | G11C 7/10 |
| 2016/0335120 A1* | 11/2016 | Gupta | .................. | G06F 9/5044 |
| 2016/0373416 A1* | 12/2016 | Burger | .................... | G06F 21/72 |
| 2018/0082083 A1* | 3/2018 | Smith | ..................... | G06F 21/64 |
| 2018/0088174 A1* | 3/2018 | Davis | .................. | G06F 11/3656 |
| 2018/0088992 A1* | 3/2018 | Davis | .................. | G06F 13/4068 |
| 2018/0091484 A1* | 3/2018 | Atta | .................... | H04L 63/0428 |
| 2018/0095670 A1* | 4/2018 | Davis | ....................... | G06F 13/28 |
| 2018/0095774 A1* | 4/2018 | Atta | .................... | G06F 9/45558 |
| 2018/0139110 A1* | 5/2018 | Johnson | .............. | H04L 41/5054 |
| 2018/0189675 A1* | 7/2018 | Nurvitadhi | .............. | G06F 17/16 |
| 2018/0302281 A1* | 10/2018 | Khan | ..................... | H04L 67/34 |
| 2018/0315158 A1* | 11/2018 | Nurvitadhi | ................ | G06T 1/20 |
| 2018/0341722 A1* | 11/2018 | Satpathy | ........... | G06F 16/90339 |

* cited by examiner

DATA-DRIVEN PLATFORM CHARACTERISTICS CAPTURE AND DISCOVERY FOR HARDWARE ACCELERATORS

TECHNICAL FIELD

Examples of the present disclosure generally relate to hardware acceleration in computing systems and, in particular, to data-driven platform characteristics capture and discovery for hardware accelerators.

BACKGROUND

Central processing unit (CPU)-based computing systems include a basic input-output system (BIOS) or like type firmware that provides data tables describing characteristics of the system. Likewise, graphics processing unit (GPU)-based peripherals have similar firmware-based tables having documented structures. Software executing on the computing system can obtain various characteristics of the platform and peripherals using the data tables exposed by respective firmwares.

Hardware acceleration involves the use of hardware to perform some functions more efficiently than software executing on a general-purpose CPU. A hardware accelerator is special-purpose hardware designed to implement hardware acceleration for some application. Example applications include neural networks, video encoding, decoding, transcoding, etc., network data processing, and the Ike. Software executing on the computing system interacts with the hardware accelerator through various drivers and libraries. It is desirable for the drivers/libraries, as well as other applications, to be able to determine characteristics of the hardware accelerator in a manner similar to the firmware data tables present CPU-based and GPU-based systems.

SUMMARY

Techniques for data-driven platform characteristics capture and discovery for hardware accelerators are described. In an example, a computing system includes: a processing system; a hardware accelerator coupled to the processing system, and a software platform executing on the processing system. The hardware accelerator includes: a programmable integrated circuit (IC) configured with an acceleration circuit having a static region and a programmable region; a memory in the programmable IC configured to store metadata describing interface circuitry in at least one of the static region and the programmable region of the acceleration circuit. The software platform includes program code executable by the processing system to read the metadata from the memory of the programmable IC.

In another example, a hardware accelerator for a computer system includes: a programmable integrated circuit (IC); and an acceleration circuit, programmed in the programmable IC, including a static region and a programmable region, the static region including interface circuitry and a memory, the programmable region including one or more kernel circuits, the memory storing metadata that describes the interface circuitry of the static region.

In another example, a method of hardware acceleration in a computing system includes: configuring a programmable IC with a static region of an acceleration circuit, a memory in the static region storing metadata describing interface circuitry of a base platform; receiving a request to program a programmable region of the acceleration circuit with a kernel image; and determining compatibility of the kernel image with the base platform based on the metadata stored in the memory of the static region.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

Techniques for data-driven platform characteristics capture and discovery for hardware accelerators are described. In an example, a computing system includes a processing system (e.g., a processor, memory, etc.) and a hardware accelerator. The hardware accelerator includes a programmable integrated circuit (IC), such as a field programmable gate array (FPGA). The programmable IC is configured with an acceleration circuit having a static region and a programmable region. The programmable IC includes a memory that stores metadata describing interface circuitry in the static region and/or the programmable region of the acceleration circuit. Software executing on the processing system reads the metadata from the memory. The metadata can be used for data sharing, error checking functionality discovery, optimizations, and the like. Design tool(s) generate configuration data based on the design of the acceleration circuit. The design tools programmatically capture and generate the metadata with platform, device, and user design specific data in a structured format. Drivers or other software executing on the processing system can read this metadata to achieve the tasks described above. In some examples, the software can also write to the memory (e.g., in a scratchpad section). These and other aspects of the techniques are described below with respect to the drawings.

Figure 1:
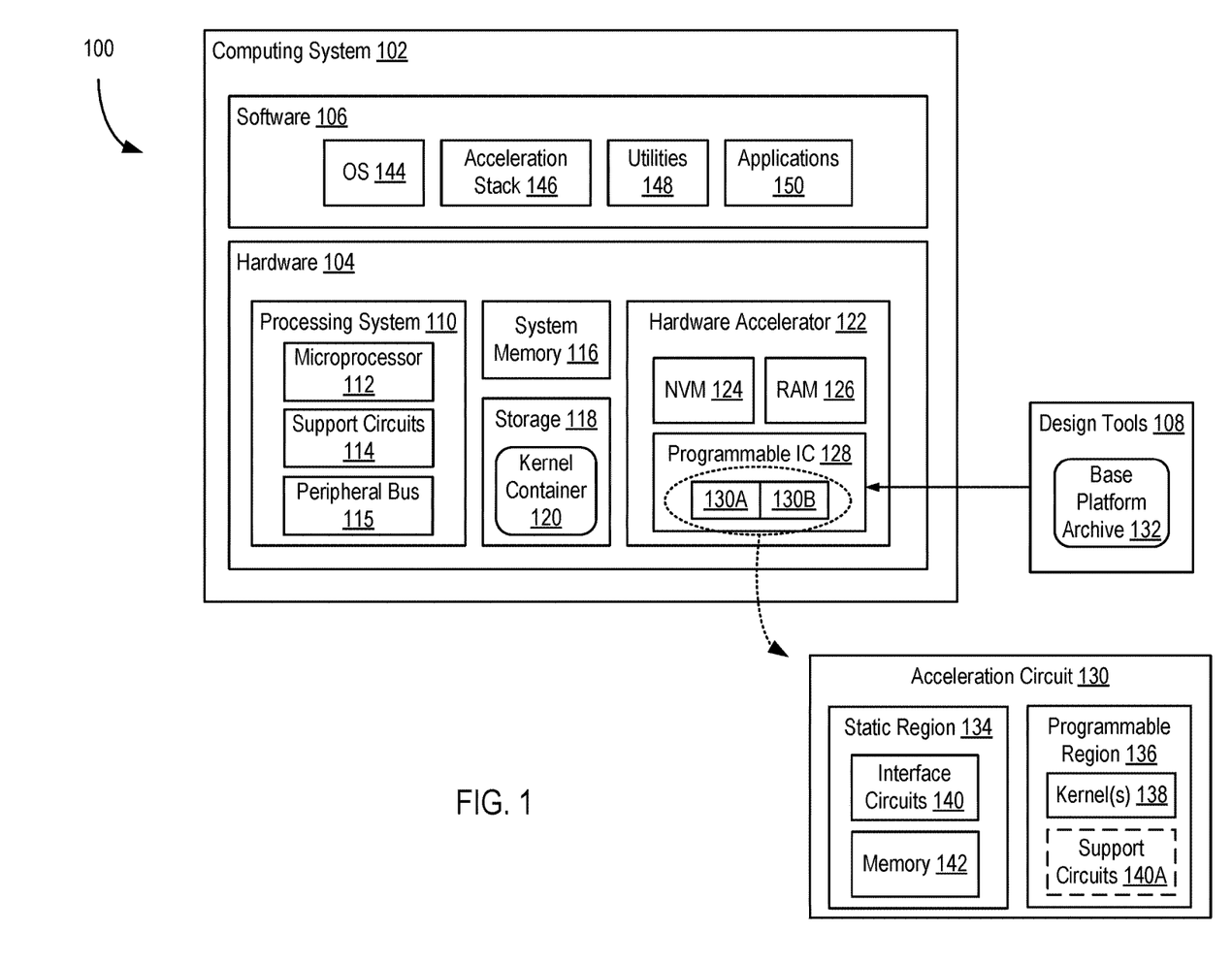
FIG. 1 is a block diagram depicting a hardware acceleration system according to an example.

FIG. 1 is a block diagram depicting a hardware acceleration system 100 according to an example. The hardware acceleration system 100 includes a computing system 102 and design tools 108. The computing system 102 includes a hardware platform ("hardware 104") and a software platform ("software 106") executing on the hardware 104. The hardware 104 includes a processing system 110, system memory 116, storage devices ("storage 118"), and a hardware accelerator 122. The software 106 includes an operating system (OS) 144, an acceleration stack 146, utilities 148, and applications 150.

The processing system 110 includes a microprocessor 112, support circuits 114, and a peripheral bus 115. The microprocessor 112 can be any type of general-purpose central processing unit (CPU), such as an x86-based processor, ARMC)-based processor, or the like. The microprocessor 112 can include one or more cores and associated circuitry (e.g., cache memories, memory management units (MMUs), interrupt controllers, etc.). The microprocessor 112 is configured to execute program code that perform one or more operations described herein and which can be stored in the system memory 116 and/or the storage 118. The support circuits 114 include various devices that cooperate with the microprocessor 112 to manage data flow between the microprocessor 112, the system memory 116, the storage 118, the hardware accelerator 122, or any other peripheral device. For example, the support circuits 114 can include a chipset (e.g., a north bridge, south bridge, platform host controller, etc.), voltage regulators, firmware (e.g., a BIOS), and the like. The support circuits 114 manage data flow between the microprocessor 112 and the peripheral bus 115, to which various peripherals, such as the hardware accelerator 122, are connected. In some examples, the microprocessor 112 can be a System-in-Package (SiP), System-on-Chip (SoC), or the like, which absorbs all or a substantial portion of the functionality of the chipset (e.g., north bridge, south bridge, etc.). The peripheral bus can implement an expansion bus standard, such as Peripheral Component Interconnect Express (PCIe). In the example, the processing system 110 is shown separate from the hardware accelerator 122. In other examples discussed further below, the processing system 110 and the hardware accelerator 122 can be implemented on the same integrated circuit (IC).

The system memory 116 is a device allowing information, such as executable instructions and data, to be stored and retrieved. The system memory 116 can include, for example, one or more random access memory (RAM) modules, such as double-data rate (DDR) dynamic RAM (DRAM). The storage 118 includes local storage devices (e.g., one or more hard disks, flash memory modules, solid state disks, and optical disks) and/or a storage interface that enables the computing system 102 to communicate with one or more network data storage systems. The hardware 104 can include various other conventional devices and peripherals of a computing system, such as graphics cards, universal serial bus (USB) interfaces, and the like.

The hardware accelerator 122 includes a programmable IC 128, a non-volatile memory 124, and RAM 126. The programmable IC 128 can be a field programmable gate array (FPGA) or the like or an SoC having an FPGA or the like. The NVM 124 can include any type of non-volatile memory, such as flash memory or the like. The RAM 126 can include DDR DRAM or the like. The programmable IC 128 is coupled to the NVM 124 and the RAM 126. The programmable IC 128 is also coupled to the peripheral bus 115 of the processing system 110.

The OS 144 can be any commodity operating system known in the art, such as such as Linux®, Microsoft Windows®, Mac OS®, or the like. The acceleration stack 146 includes drivers and libraries that provide application programming interfaces (APIs) to the hardware accelerator 122 for command and control thereof. The utilities 148 include software executing on the microprocessor 112 that communicate with the hardware accelerator 122 through the acceleration stack 146 to perform various testing and like type functions. The applications 150 include software executing on the microprocessor 112 that invokes the hardware accelerator 122 through the acceleration stack 146 to perform some work. The applications 150 can include neural network, video processing, network processing, or the like type applications that offload some functions to the hardware accelerator 122.

In operation, the programmable IC 128 is configured with an acceleration circuit 130. The acceleration circuit 130 generally includes a base platform 130A and a kernel 130 6. For example, the acceleration circuit 130 can be implemented using a static region 134 and a programmable region 136. The static region 134 includes interface circuits 140 and a memory 142. The programmable region 136 can include one or more kernel circuits ("kernel(s) 138"). The base platform 130A is implemented using the static region 134, and the kernel 130B is implemented using the programmable region 136. In another example, the base platform 130A can also be implemented using a portion of the programmable region 136. Thus, in some examples, the programmable region 136 also includes some interface circuits 140A. In some examples, the acceleration circuit 130 can include more than one programmable region 136, each of which can be individually configured with kernel(s) 138.

The static region 134 is "static" in that the circuitry thereof remains constant across reconfigurations of the programmable region 136. In an example, the interface circuits 140 include PCIe endpoint circuits, a direct memory access (DMA) controller, interconnects, a memory controller, a memory interface circuit (e.g., a DDR interface), decoupler circuits (to support partial reconfiguration), flash programmer, debug circuits, and the like. In some examples, the programmable region 136 does not include any of the interface circuits 140. In other examples, a portion of the base platform interface circuits (referred to as interface circuits 140A) are implemented in the programmable region 136. In such case, the programmable region 136 can be referred to as an "expanded programmable region." In either case, some interface circuits 140 are always present in the static region 134, such as the PCIe circuits.

In examples, the static region 134 includes the memory 142, which stores characteristics of the base platform 130A (referred to as base platform metadata). The portion of the memory 142 storing the base platform metadata can be implemented as a read-only memory (ROM). In some examples, the memory 142 can also include a readable and writeable portion that can be used by the software 106 and/or the hardware accelerator 122 to store and retrieve data (referred to as a "scratchpad").

The memory 142 is memory-mapped to a portion of an address space implemented by the interface circuits 140. The base platform metadata is located at a designated offset in the address space. The acceleration stack 146 can read the base platform metadata using DMA operations targeting the designated offset. The base platform metadata can be used for data sharing, error checking, functionality discovery, and optimizations of the hardware accelerator 122. The base platform metadata can include, for example, identification information (e.g., version numbers, revision numbers, timestamps, names, IDs, and the like), memory channel counts, memory channel sizes, programmable region count, programmable IC type, clock information (e.g., clock scaling information), and like type characteristics of the hardware accelerator 122. In an example, the base platform metadata includes a clock scaling table. The acceleration stack 146 can read from and write to the scratchpad using DMA operations for the purpose of error retrieval, user-visible optimizations, and the like. In general, the base platform metadata describes interface circuitry in the static region 134 and/or the programmable region 136 of the acceleration circuit 130 currently programmed in the programmable IC 128 of the hardware accelerator 122.

A circuit designer uses the design tools 108 to generate the base platform 130A of the acceleration circuit 130. The base platform 130A includes the interface circuits 140 (an optionally the interface circuits 140A) and the memory 142. An image of the base platform and metadata associated therewith are stored in a base platform archive 132. A circuit designer can use design tools 108 to generate different base platform archives for different base platforms. In addition, the design tools 108 may provide one or more base platform archives 132 for use with the hardware accelerator 122. In each base platform archive, the base platform image includes a binary file representing a bitstream to be loaded into configuration memory of the programmable IC 128. A user transmits the base platform image from a selected base platform archive 132 to the programmable IC 128 using the design tools 108 (e.g., through a configuration interface of the programmable IC 128). The programmable IC 128 stores the base platform image in the NVM 124. Thus, the selected base platform image becomes firmware for the hardware accelerator 122. Upon power-on, the programmable IC 128 can load the base platform image into its configuration memory to implement the interface circuits 140 and the memory 142.

A user can use the design tools 108 to generate various kernel images for different types of kernels having various applications (e.g., neural networks, video processing, network processing, etc.). The design tools 108 generate binary containers 120, each of which includes a kernel image and corresponding metadata. The binary container(s) 120 can be stored in hardware 104 (e.g., as a file in the storage 118). A user can execute an application 150 and designate a particular binary container 120. The acceleration stack 146 processes the designated binary container 120, extracts the kernel image, and partially reconfigures the programmable IC 128 to implement the kernel(s) 138 (an optionally the interface circuits 140A). As the user executes different applications 150, the acceleration stack 146 can reconfigure the programmable IC 128 using different kernel images.

The base platform and the kernel(s) of the acceleration circuit 130 must be compatible. Otherwise, the programmable IC 128 may not function properly, requiring a hardware reset, and/or may be physically damaged. Thus, the binary containers 120 are compatible with some base platform archives 132 and incompatible with other base platform archives 132. The acceleration stack 146 can use identification information in the base platform metadata to verify that a particular binary container 120 is compatible with the currently configured base platform. The acceleration stack 146 can also obtain information related to the interface circuits 140, such as memory channel counts, number of programmable regions, clock information, whether the programmable region is expanded, and the like, in order to discover functionality and/or perform optimizations of the hardware accelerator 122. The acceleration stack 146 and/or utilities 148 can perform various functions using the base platform metadata and/or scratchpad of the memory 142, as discussed further below.

Figure 2:
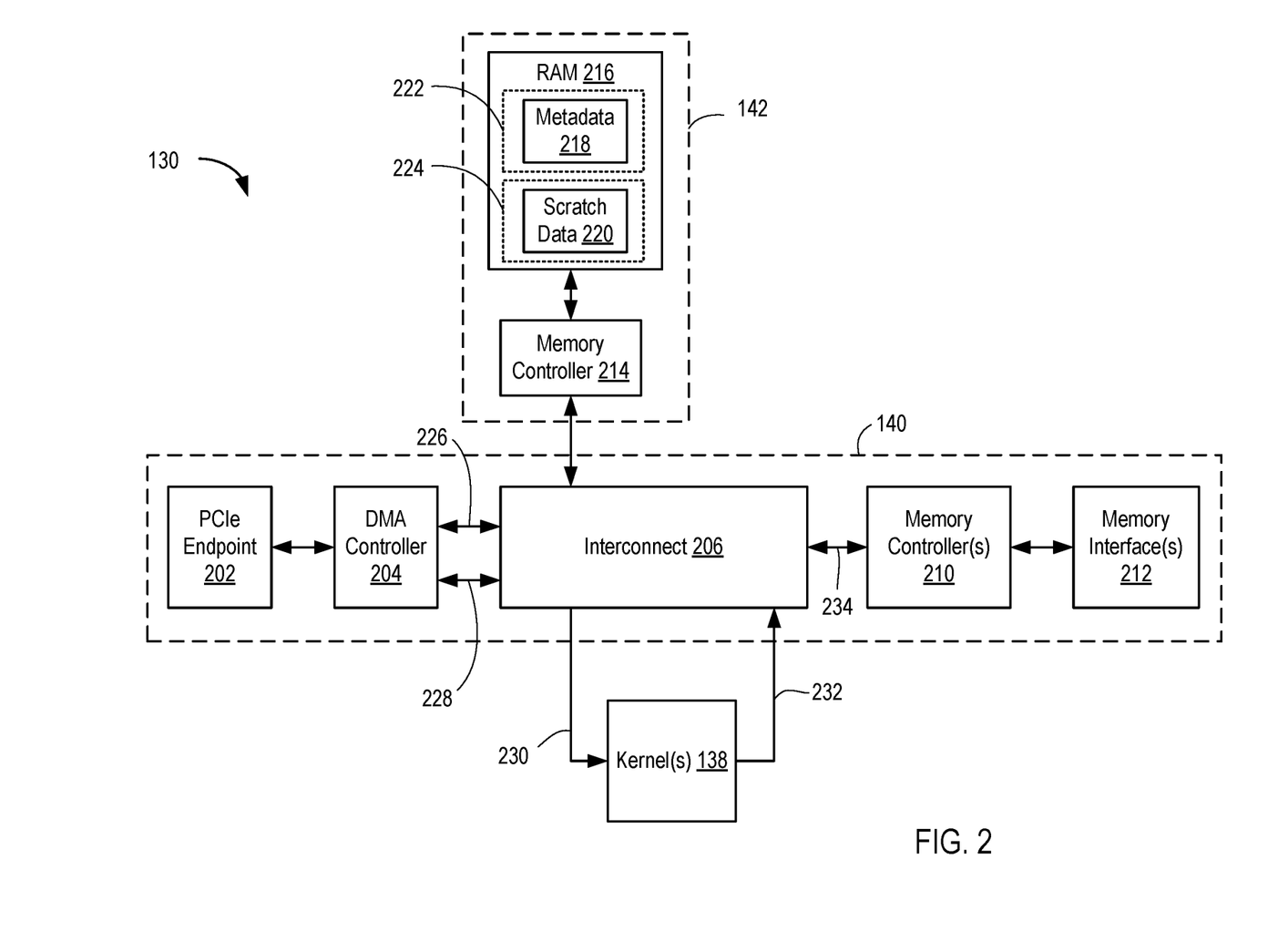
FIG. 2 is a block diagram depicting an acceleration circuit according to an example.

FIG. 2 is a block diagram depicting an acceleration circuit 130 according to an example. The acceleration circuit 130 includes the interface circuits 140, the memory 142, and the kernel(s) 138. In the example, the interface circuits 140 include a PCIe endpoint circuit ("PCIe endpoint 202"), a DMA controller 204, interconnect circuits ("interconnect 206"), a memory controller 210, and a memory interface 212. The interface circuits 140 can include other support circuits, which are omitted for clarity (e.g., decoupler circuits, debug circuits, etc). The PCIe endpoint 202 provides a physical interface to the peripheral bus 115. The DMA controller 204 facilitates DMA operations to the RAM 126, the memory 142, and the kernel(s) 138. The interconnect 206 couples the DMA controller 204 to the memory 142 and to an input interface of the kernel(s) 138. The interconnect 206 is also coupled to the interconnect 208. The interconnect 208 is coupled to an output interface of the kernel(s) 238 and the memory controller 210. The memory controller 210 is coupled to the memory interface 212. The memory interface 212 is coupled to the RAM 126 (shown in FIG. 1).

In operation, the acceleration stack 146 can access the RAM 126 directly through the DMA controller 204. The acceleration stack 146 can also access the memory 142 through the DMA controller 204. The DMA controller 204 and the interconnects 206, 208 can implement separate address spaces for the memory 142 and the RAM 126. The kernel(s) 138 can access the RAM 126 through the memory controller 210. The acceleration stack 146 can access the kernel(s) 138 through the DMA controller 204 (e.g., to provide commands and instructions). Data can be exchanged between the software 106 and the kernel(s) 138 using DMA operations between the system memory 116 and the RAM 126.

In an example, the memory 142 includes a controller 214 and a RAM 216. The controller 214 is coupled to the interconnect 206. The RAM 216 is coupled to the controller 214. The RAM 216 stores base platform metadata ("metadata 218") in a first portion 222 of the RAM 216. The RAM 216 stores scratch data 220 in a second portion 224 of the RAM 216. In an example, the controller 214 controls the RAM 216 such that the portion 222 having the metadata 218 is read-only and the portion 224 having the scratch data 220 is readable and writeable. In some examples, the metadata 218 and the scratch data 220 can be implemented using separate memory modules (e.g., a ROM for the metadata 218 and a RAM for the scratch data 220). The acceleration stack 146 accesses the controller 214 and the RAM 216 through the DMA controller 204 using DMA operations based on a designated offset. The acceleration stack 146 knows the size of the metadata 218 or the metadata 218 can include fields at designated offsets that specify its size. The metadata 218 can include a field that specifies the offset of the scratch data 220.

Figure 3:
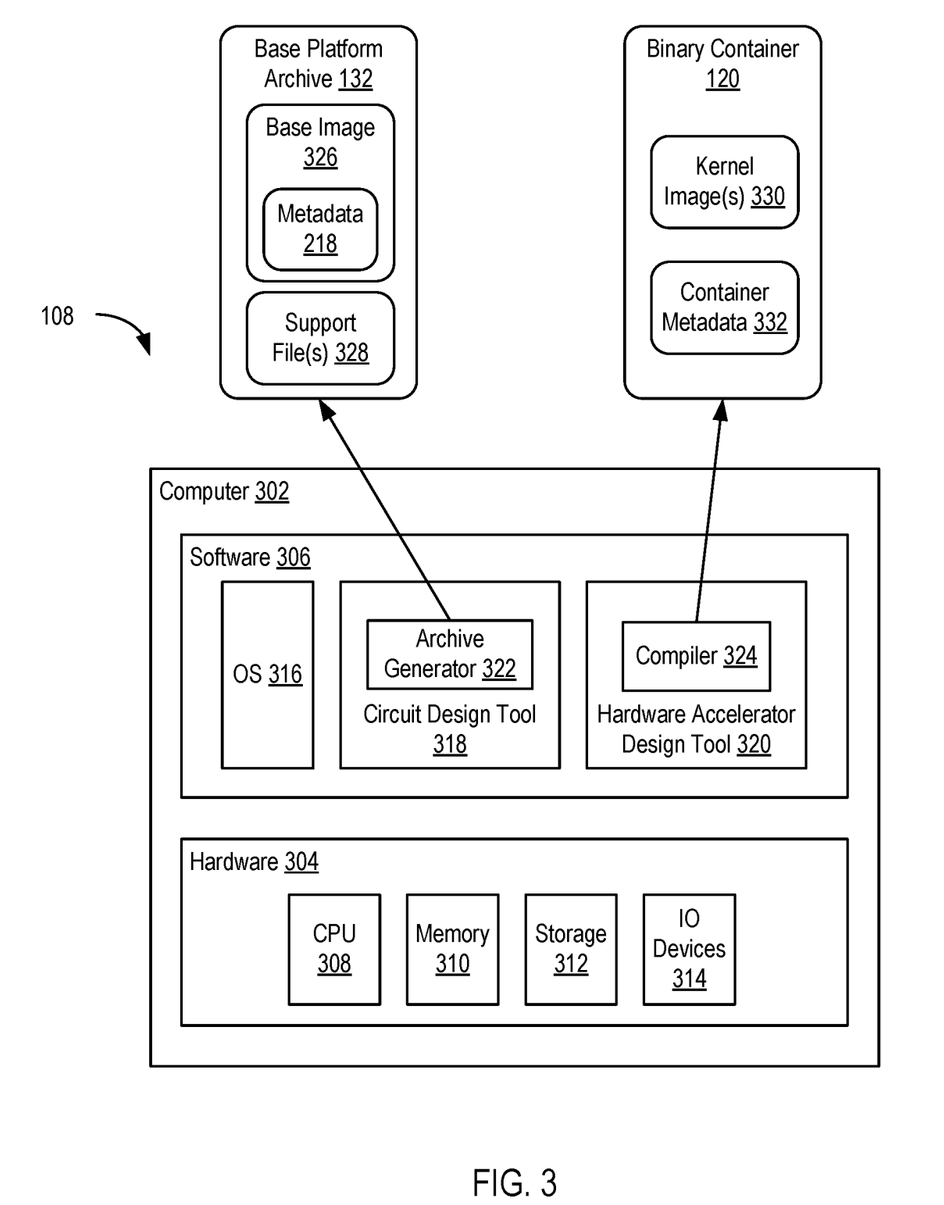
FIG. 3 is a block diagram depicting circuit design tools according to an example.

FIG. 3 is a block diagram depicting the design tools 108 according to an example. The design tools 108 include a computer 302 having a hardware platform 304 and a software platform 306. The hardware platform 304 includes a CPU 308, a memory 310, storage devices 312, and input/output (IO) devices 314. The CPU 308 can be any type of microprocessor. The memory 310 can include, for example, one or more RAM modules, such as DDR DRAM. The storage devices 312 includes local storage devices (e.g., one or more hard disks, flash memory modules, solid state disks, and optical disks) and/or a storage interface that enables the computer 302 to communicate with one or more network data storage systems. The 10 devices 314 enable communication to and from the computer 302. The software platform 306 includes an OS 316, a circuit design tool 318, and a hardware accelerator design tool 320. The OS 316 can be any commodity operating system known in the art, such as such as Linux®, Microsoft Windows®, Mac OS®, or the like. The circuit design tool 318 is configured to generate circuit designs that can be used to program programmable ICs. The hardware accelerator design tool 320 is configured to generate kernel designs for acceleration circuits.

In particular, the circuit design tool 318 includes an archive generator 322. A circuit design interacts with the circuit design tool 318 to generate a circuit design for the base platform 130A of the acceleration circuit 130. The archive generator 322 generates a base platform archive 132. The base platform archive 132 includes a base image 326 and one or more support file(s) 328. The base image 326 includes configuration data for programming the programmable IC 128 (e.g., an FPGA configuration bitstream). The support file(s) 328 include various data describing attributes of the base image 326. The base image 326 also includes the base platform metadata (i.e., the metadata 218), which is accessible during runtime by accessing the RAM 216, as discussed above. The metadata 218 can include information derived from the support files 328 or from other data generated by the circuit design tool 318.

The hardware accelerator design tool 320 includes a compiler 324. A user interacts with the hardware accelerator design tool 320 to generate kernel design(s) for the acceleration circuit 130. The compiler 324 generates a binary container 120 that includes kernel image(s) 330 and container metadata 332. The kernel image(s) 330 include configuration data for programming a programmable IC (e.g., FPGA configuration bitstreams). The kernel image(s) 330 can be partial configuration data that will be combined with the configuration data of the base image 326 to instantiate the complete acceleration circuit 130 (e.g., partial bitstreams). The container metadata 332 includes data describing attributes of the kernel image(s) 330.

Figure 4:
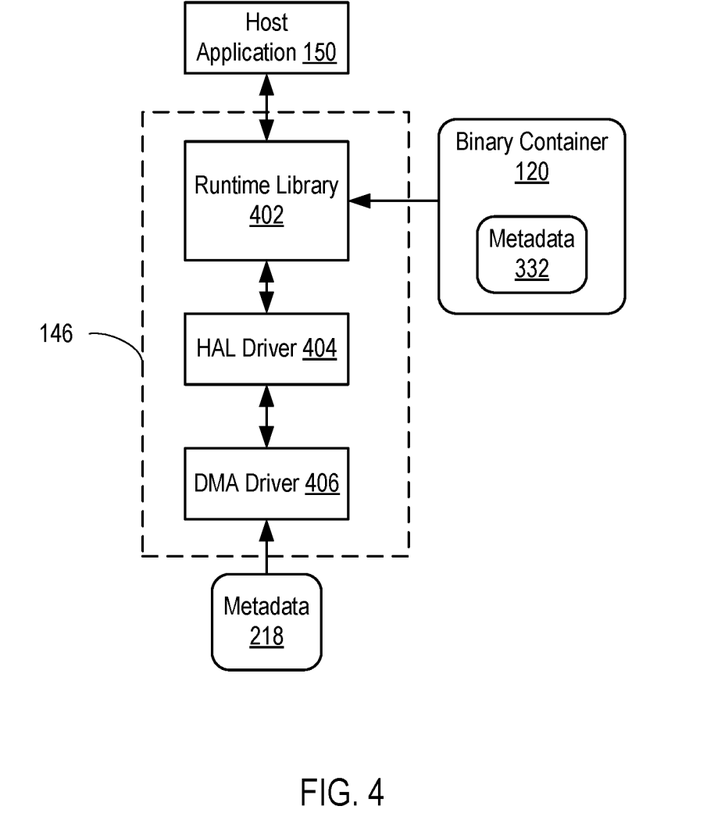
FIG. 4 is a block diagram depicting operation of an acceleration stack according to an example.

FIG. 4 is a block diagram depicting operation of the acceleration stack 146 according to an example. The acceleration stack 146 includes a runtime library 402, a hardware abstraction layer (HAL) driver 404, and a DMA driver 406. The runtime library 402 provides an application programming interface (API) for use by the application 150. The runtime library 402 provides an interface between the host application 150 and the HAL driver 404. The HAL driver 404 likewise includes an API for use by the runtime library 402. The HAL driver 404 provides an interface between the runtime library 402 and the DMA driver 406. The DMA driver 406 includes an API for controlling the hardware accelerator 122. In particular, the DMA driver 406 includes API(s) for accessing the memory 142 of the acceleration circuit 130.

Figure 5:
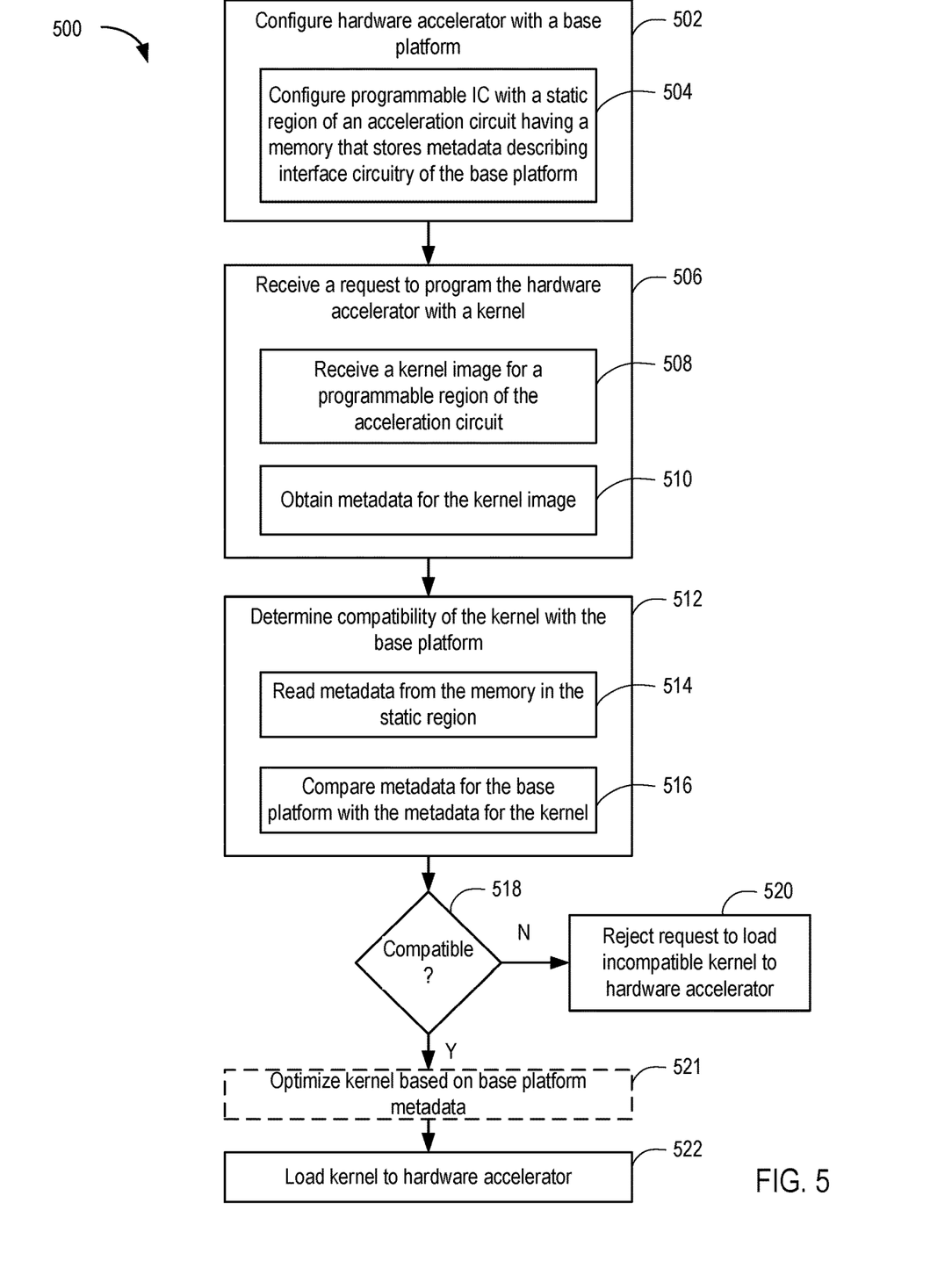
FIG. 5 is a flow diagram depicting a method of hardware acceleration in a computer system according to an example.

FIG. 5 is a flow diagram depicting a method 500 of hardware acceleration in a computer system according to an example. Aspects of the method 500 may be understood with reference to FIGS. 1-4. The method 500 begins at step 502, where the user configures the hardware accelerator 122 with the base platform 130A. In an example, at step 504, the user configures the programmable IC 128 with the static region 134 of the acceleration circuit 130 having the memory 142 that stores the base platform metadata (i.e., the metadata 218). As described above, the base platform metadata describes interface circuitry of the base platform 130A. The user can configure the base platform in the programmable IC 128 by loading configuration data for the base platform to the NVM 124. The hardware accelerator 122 can program the programmable IC 128 with the base platform upon power-up of the computing system 102.

At step 506, the runtime library 402 receives a request to program the hardware accelerator 122 with a kernel. For example, a user may execute the host application 150, which is configured to perform various operations using a particular kernel. The host application 150 cooperates with the runtime library 402 to load the kernel to the hardware accelerator 122. At step 508, the runtime library 402 obtains a kernel image for the programmable region 136 of the acceleration circuit 130 for the requested kernel. At step 510, the runtime library 402 obtains metadata 332 for the kernel image.

At step 512, the runtime library 402 determines compatibility of the kernel with the base platform. For example, at step 514, the runtime library 402 reads the base platform metadata (i.e., the metadata 218) from the memory 142). At step 516, the runtime library 402 compares the base platform metadata with the metadata for the kernel. At step 518, the runtime library 402 determines if the kernel is compatible with the base platform. If not, the method 500 proceeds to step 520, where the runtime library 402 rejects the request to load the incompatible kernel to the hardware accelerator 122. Otherwise, the method 500 proceeds to step 522, where the runtime library 402 loads the kernel to the hardware accelerator 122. For example, the runtime library 402 can perform partial reconfiguration of the programmable IC 128 to implement the kernel. At step 521, prior to loading the kernel to the hardware accelerator 122, the runtime library 402 can optimize the kernel based on the base platform metadata. For example, the base platform metadata can specify a clock scaling table that can be used to adjust clock resources in the programmable IC. The runtime library 402 can read the clock scaling table from the metadata and issue commands to the programmable IC to adjust one or more clock resources in response to values in the clock scaling table.

Figure 6:
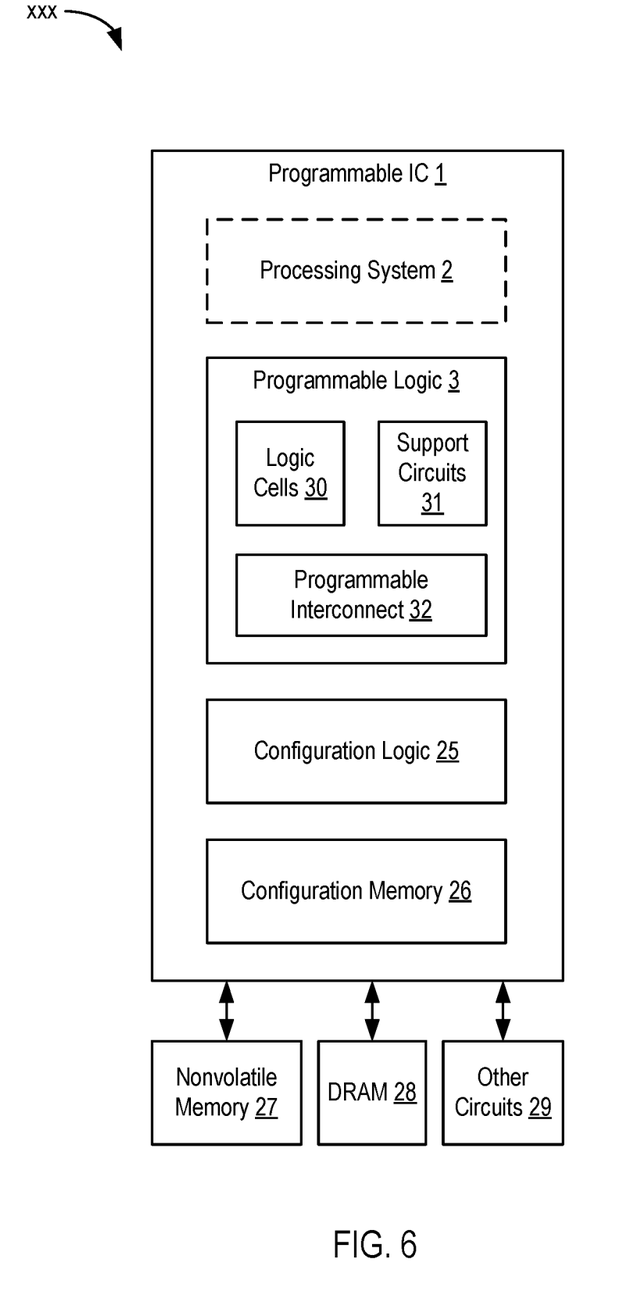
FIG. 6 is a block diagram depicting a programmable IC according to an example.

FIG. 6 is a block diagram depicting a programmable IC 1 according to an example. The programmable IC 1 includes programmable logic 3, configuration logic 25, and configuration memory 26. The programmable IC 1 can be coupled to external circuits, such as nonvolatile memory 27, DRAM 28, and other circuits 29. The programmable logic 3 includes logic cells 30, support circuits 31, and programmable interconnect 32. The logic cells 30 include circuits that can be configured to implement general logic functions of a plurality of inputs. The support circuits 31 include dedicated circuits, such as transceivers, input/output blocks, digital signal processors, memories, and the like. The logic cells and the support circuits 31 can be interconnected using the programmable interconnect 32. Information for programming the logic cells 30, for setting parameters of the support circuits 31, and for programming the programmable interconnect 32 is stored in the configuration memory 26 by the configuration logic 25. The configuration logic 25 can obtain the configuration data from the nonvolatile memory 27 or any other source (e.g., the DRAM 28 or from the other circuits 29). In some examples, the programmable IC 1 includes a processing system 2. The processing system 2 can include microprocessor(s), memory, support circuits, 10 circuits, and the like.

Figure 7:
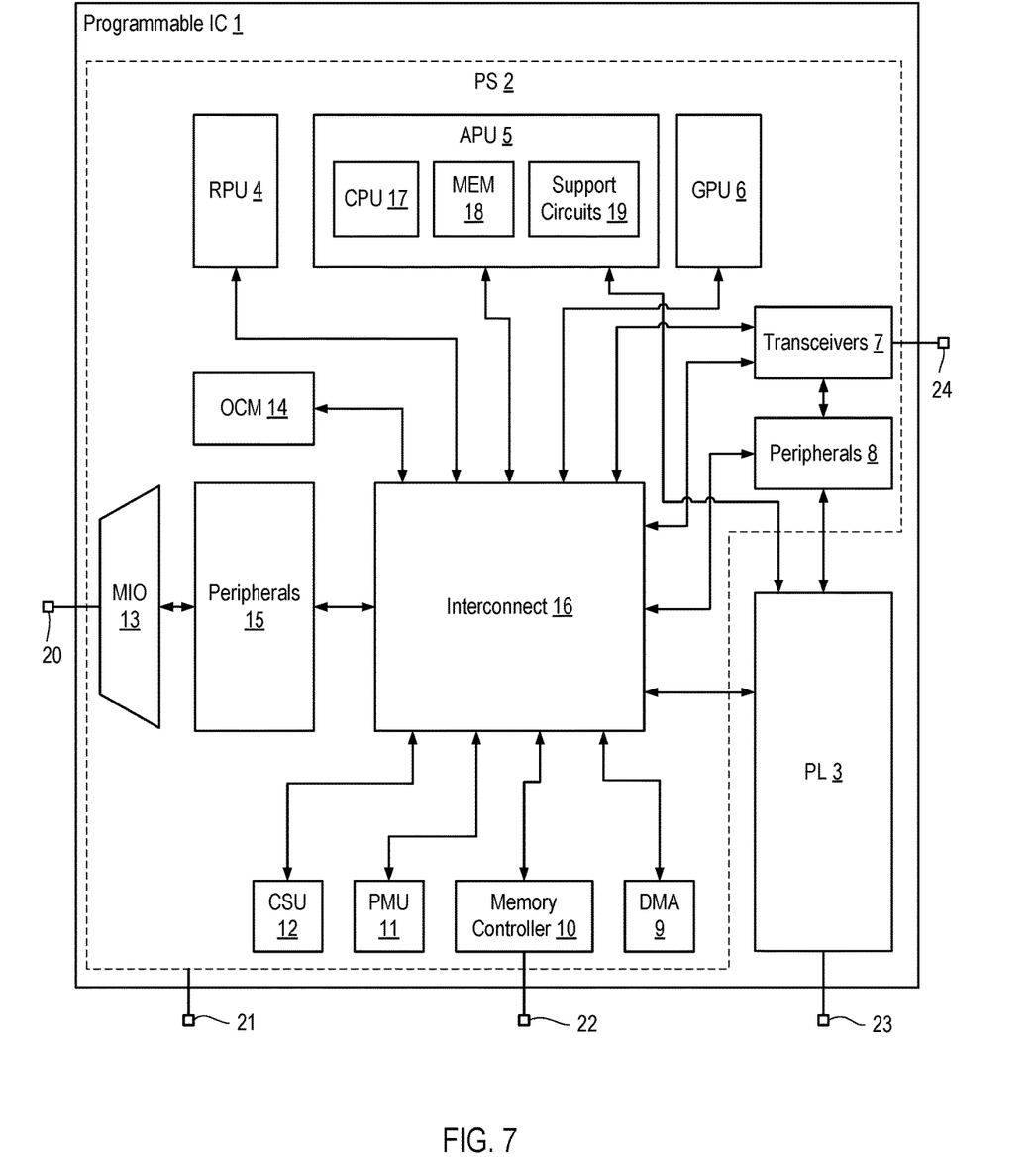
FIG. 7 is a block diagram depicting a System-on-Chip (SoC) implementation of a programmable IC according to an example.

FIG. 7 is a block diagram depicting a System-on-Chip (SoC) implementation of the programmable IC 1 according to an example. In the example, the programmable IC 1 includes the processing system 2 and the programmable logic 3. The processing system 2 includes various processing units, such as a real-time processing unit (RPU) 4, an application processing unit (APU) 5, a graphics processing unit (GPU) 6, a configuration and security unit (CSU) 12, a platform management unit (PMU) 122, and the like. The processing system 2 also includes various support circuits, such as on-chip memory (OCM) 14, transceivers 7, peripherals 8, interconnect 16, DMA circuit 9, memory controller 10, peripherals 15, and multiplexed 10 (MIO) circuit 13. The processing units and the support circuits are interconnected by the interconnect 16. The PL 3 is also coupled to the interconnect 16. The transceivers 7 are coupled to external pins 24. The PL 3 is coupled to external pins 23. The memory controller 10 is coupled to external pins 22. The MIO 13 is coupled to external pins 20. The PS 2 is generally coupled to external pins 21. The APU 5 can include a CPU 17, memory 18, and support circuits 19.

In the example of FIG. 7, the programmable IC 1 can be used in the hardware accelerator 122 and can function as described above. The accelerator circuit 130 can be programmed in the PL 3 and function as described above. In another example, the functionality of the hardware 104 described above can be implemented using the PS 2, rather than through hardware of a computing system. In such case, the software 106 executes on the PS 2 and functions as described above.

Referring to the PS 2, each of the processing units includes one or more central processing units (CPUs) and associated circuits, such as memories, interrupt controllers, direct memory access (DMA) controllers, memory management units (MMUs), floating point units (FPUs), and the like. The interconnect 16 includes various switches, busses, communication links, and the like configured to interconnect the processing units, as well as interconnect the other components in the PS 2 to the processing units.

The OCM 14 includes one or more RAM modules, which can be distributed throughout the PS 2. For example, the OCM 14 can include battery backed RAM (BBRAM), tightly coupled memory (TCM), and the like. The memory controller 10 can include a DRAM interface for accessing external DRAM. The peripherals 8, 15 can include one or more components that provide an interface to the PS 2. For example, the peripherals 15 can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose 10 (GPIO) ports, serial advanced technology attachment (SATA) ports, PCIe ports, and the like. The peripherals 15 can be coupled to the MIO 13. The peripherals 8 can be coupled to the transceivers 7. The transceivers 7 can include serializer/deserializer (SERDES) circuits, MGTs, and the like.

Figure 8:
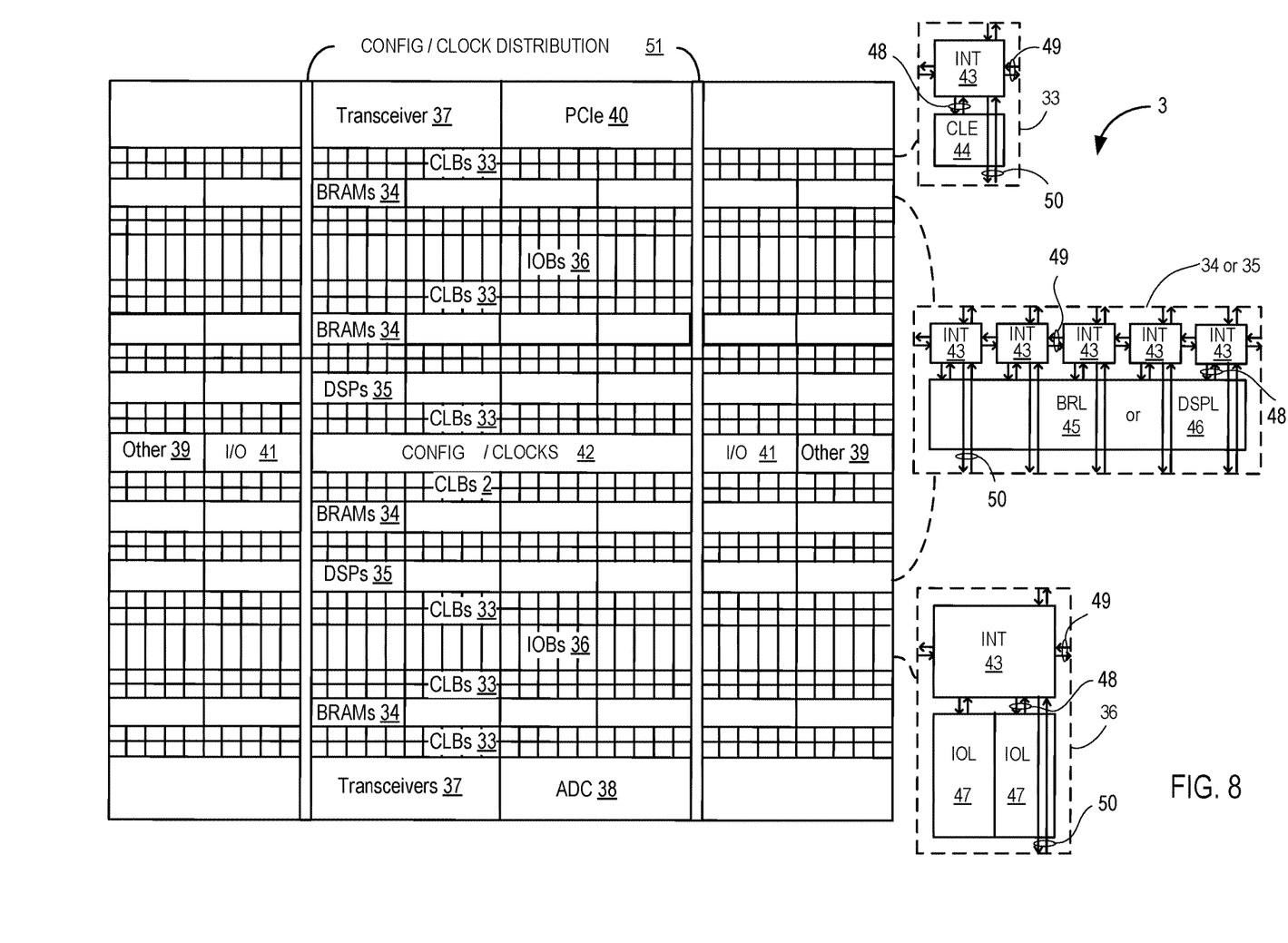
FIG. 8 illustrates a field programmable gate array (FPGA) implementation of a programmable IC according to an example.

FIG. 8 illustrates a field programmable gate array (FPGA) implementation of the programmable IC 1 that includes a large number of different programmable tiles including transceivers 37, configurable logic blocks ("CLBs") 33, random access memory blocks ("BRAMs") 34, input/output blocks ("CLBs") 36, configuration and clocking logic ("CONFIG/CLOCKS") 42, digital signal processing blocks ("DSPs") 35, specialized input/output blocks ("I/O") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 8. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An 10B 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 8) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 8 include additional logic blocks that disrupt the regular columnar structure making up a large part of the FPGA. The additional logic blocks can be programmable blocks and/or dedicated logic.

Note that FIG. 8 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 8 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing is directed to specific examples, other and further examples may be devised without departing from the basic scope thereof, and the scope thereof is determined by the claims that follow.

What is claimed is:

1. A hardware accelerator, comprising:
   a programmable integrated circuit (IC) configured with an acceleration circuit having a static region and a programmable region; and
   a memory in the programmable IC configured to store metadata describing interface circuitry in at least one of the static region and the programmable region of the acceleration circuit, wherein the memory is memory-mapped to a portion of an address space implemented by the interface circuitry;
   wherein software executing on a processing system coupled to the hardware accelerator to is configured to read the metadata from the memory of the hardware accelerator.

2. The hardware accelerator of claim 1, wherein the software is configured to write data to the memory of the hardware accelerator.

3. The hardware accelerator of claim 1, wherein the software is configured to:
   request configuration of the programmable region of the acceleration circuit with a kernel circuit based on a kernel image; and
   determine, as a condition for partially reconfiguring the programmable IC with the kernel image, whether the kernel circuit is compatible with the interface circuitry by processing identification data in the metadata.

4. The hardware accelerator of claim 1, wherein the interface circuitry includes a direct memory access (DMA) controller coupled to a peripheral bus of the processing system, wherein the memory is coupled to the DMA controller and mapped to an address space of the DMA controller, and wherein the metadata is stored at a designated offset in the address space of the DMA controller.

5. The hardware accelerator of claim 4, wherein the memory comprises a memory controller coupled to the DMA controller, and a random access memory (RAM) coupled to the memory controller.

6. The hardware accelerator of claim 5, wherein a first portion of the memory that stores the metadata is read-only through the memory controller and a second portion of the memory is readable and writeable through the memory controller.

7. The hardware accelerator of claim 1, wherein the metadata includes a clock scaling table, and wherein program code is executable by the processing system to control one or more clock resources in the programmable IC in response to the clock scaling table.

8. A hardware accelerator for a computer system, comprising:
   a programmable integrated circuit (IC); and
   an acceleration circuit, programmed in the programmable IC, including a static region and a programmable region, the static region including interface circuitry and a memory, the programmable region including one or more kernel circuits, the memory storing metadata that describes the interface circuitry of the static region, wherein the memory is memory-mapped to a portion of an address space implemented by the interface circuitry.

9. The hardware accelerator of claim 8, wherein the interface circuitry of the static region includes a direct memory access (DMA) controller coupled to a peripheral bus, wherein the memory is coupled to the DMA controller and mapped to an address space, and wherein the metadata is stored at a designated offset in the address space.

10. The hardware accelerator of claim 9, wherein the memory comprises a memory controller coupled to the DMA controller, and a random access memory (RAM) coupled to the memory controller.

11. The hardware accelerator of claim 10, wherein a first portion of the memory that stores the metadata is read-only through the memory controller and a second portion of the memory is readable and writeable through the memory controller.

12. The hardware accelerator of claim 8, wherein the interface circuitry in the static region is first interface circuitry, wherein the programmable region includes second interface circuitry, and wherein the metadata further describes the second interface circuitry.

13. The hardware accelerator of claim 8, further comprising:
   a non-volatile memory that stores configuration data for programming the programmable IC to implement the static region.

14. The hardware accelerator of claim 8, wherein the programmable IC is a field programmable gate array (FPGA).

15. A method of hardware acceleration in a computing system, comprising:
   configuring a programmable IC with a static region of an acceleration circuit, a memory in the static region storing metadata describing interface circuitry of a base platform, wherein the memory is memory-mapped to a portion of an address space implemented by the interface circuitry;
   receiving a request to program a programmable region of the acceleration circuit with a kernel image; and
   determining compatibility of the kernel image with the base platform based on the metadata stored in the memory of the static region.

16. The method of claim 15, wherein the step of determining comprises:
   reading at least a portion of the metadata from the memory in response to the request to program the programmable region of the acceleration circuit with the kernel image.

17. The method of claim 15, wherein the interface circuitry includes a direct memory access (DMA) controller coupled to a peripheral bus, wherein the memory is coupled to the DMA controller and mapped to an address space, and wherein the metadata is stored at a designated offset in the address space.

18. The method of claim 17, wherein the memory comprises a memory controller coupled to the DMA controller, and a random access memory (RAM) coupled to the memory controller.

19. The method of claim 18, wherein a first portion of the memory that stores the metadata is read-only through the memory controller and a second portion of the memory is readable and writeable through the memory controller.

20. The method of claim 15, wherein the metadata includes a clock scaling table, and wherein the method further comprises controlling one or more clock resources in the programmable IC in response to the clock scaling table.

\* \* \* \* \*

UNITED STATES PATENT AND TRADEMARK OFFICE
CERTIFICATE OF CORRECTION

PATENT NO. : 11,474,555 B1
APPLICATION NO. : 15/684035
DATED : October 18, 2022
INVENTOR(S) : Neema et al.

It is certified that error appears in the above-identified patent and that said Letters Patent is hereby corrected as shown below:

In the Specification

Column 1, Line 30, Delete "Ike." and insert -- like. --, therefor.

Column 3, Line 29, Delete "ARMC)-based" and insert -- ARMC®-based --, therefor.

Column 4, Line 31, Delete "1306." and insert -- 130B. --, therefor.

Column 7, Line 16 (approx.), Delete "10" and insert -- IO --, therefor.

Column 9, Line 25, Delete "10" and insert -- IO --, therefor.

Column 9, Line 64, Delete "10" and insert -- IO --, therefor.

Column 10, Line 8, Delete "("CLBs")" and insert -- ("IOBs") --, therefor.

Column 10, Line 50, Delete "10B" and insert -- IOB --, therefor.

In the Claims

Column 11, Line 29, In Claim 1, after "accelerator" delete "to".

Signed and Sealed this
Seventh Day of March, 2023

Katherine Kelly Vidal
*Director of the United States Patent and Trademark Office*